(No Model.) 3 Sheets—Sheet 1.

T. D. McCLARY.
COMBINED FILTER AND PURIFIER.

No. 585,281. Patented June 29, 1897.

Witnesses
F. L. Ourand
G. Gittman

Inventor
Thomas D. McClary
By H. N. Jenkins
Attorney.

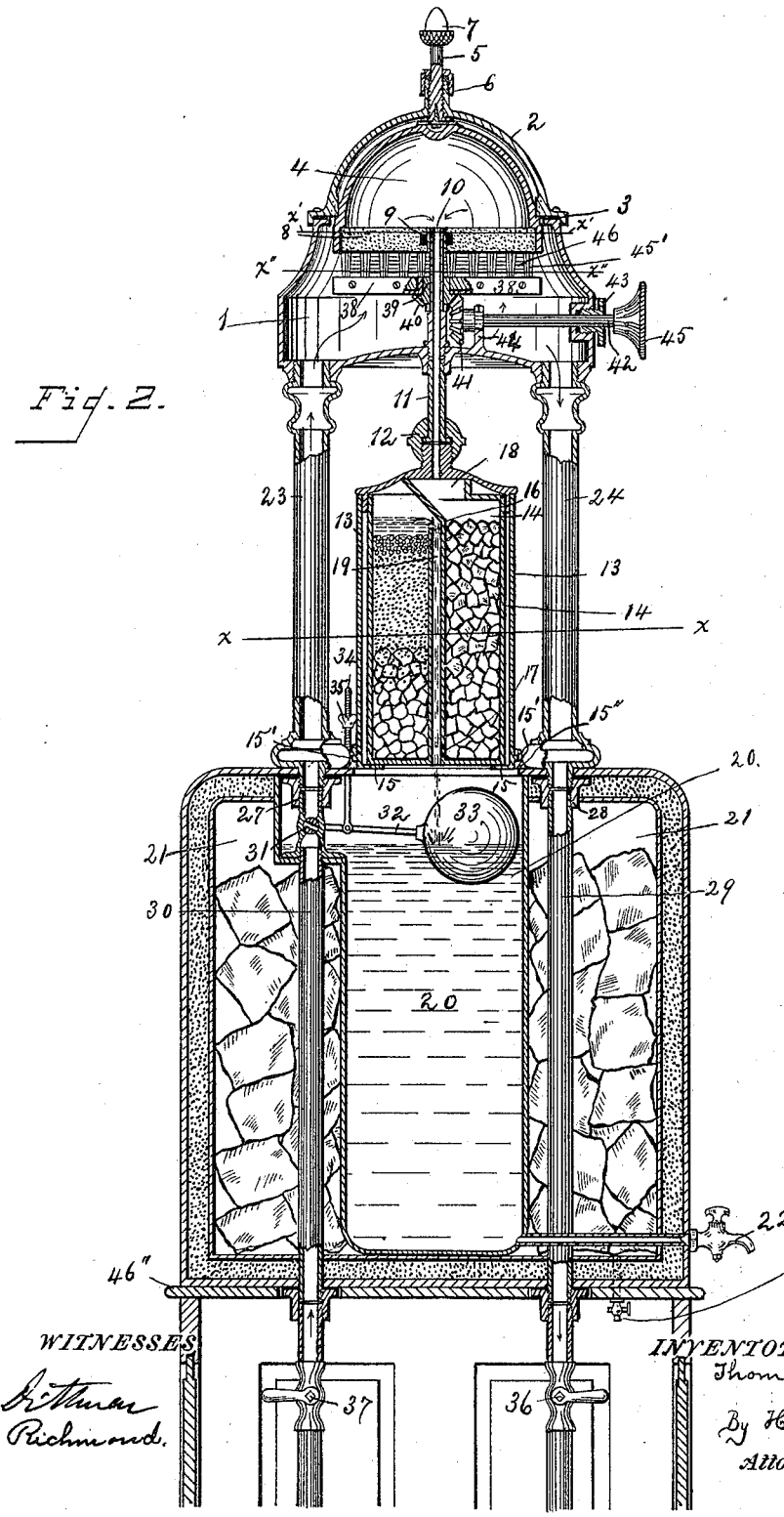

(No Model.) 3 Sheets—Sheet 3.

T. D. McCLARY.
COMBINED FILTER AND PURIFIER.

No. 585,281. Patented June 29, 1897.

WITNESSES
G. Dittman
Jas. Richmond.

INVENTOR
Thomas D. McClary
By H. N. Jenkins,
Attorney.

UNITED STATES PATENT OFFICE.

THOMAS D. McCLARY, OF WASHINGTON, DISTRICT OF COLUMBIA, ASSIGNOR TO THE McCLARY HYGIENIC FILTER COMPANY, OF WEST VIRGINIA.

COMBINED FILTER AND PURIFIER.

SPECIFICATION forming part of Letters Patent No. 585,281, dated June 29, 1897.

Application filed August 12, 1896. Serial No. 602,520. (No model.)

*To all whom it may concern:*

Be it known that I, THOMAS D. MCCLARY, a citizen of the United States, residing at Washington, in the District of Columbia, have invented new and useful Improvements in a Combined Filter and Purifier, of which the following is a specification.

This invention relates to a combined water filter and purifier, which may be connected with the service-pipe of a water-main in such manner as to automatically receive therefrom the water to be filtered.

The object of the invention is to provide a filtering apparatus in which the water or other liquid is subjected to a mechanical as well as a chemical purification by first passing the water or other liquid through a porous filtering medium, such as tripoli or unglazed earthenware, and then through a secondary filtering-chamber containing charcoal or other form of carbon.

It is well known that water that is rendered mechanically pure by mechanical filtration is not chemically pure and that it is necessary in order to remove or destroy all organic matter and deleterious gases in solution to subject the said water to a second or chemical filtration. To this end I employ in connection with the filtering-chamber containing the tripoli or unglazed earthenware diaphragm a secondary filtering-chamber containing charcoal, sand, and other filtering material, also a reservoir for the filtered water, the said parts being arranged in such a manner that the water which filters through the diaphragm passes thence directly into and through the material contained in the secondary filtering-chamber, from whence it is delivered in a thoroughly clear and purified condition into the filtered-water reservoir for use as occasion may require.

The invention also provides means for automatically regulating the inflow of water to be filtered as well as to facilitate the cleansing or renewing of the filtering material when it becomes clogged or useless.

The above-mentioned objects are attained by the means illustrated in the accompanying drawings, in which—

Figure 1:
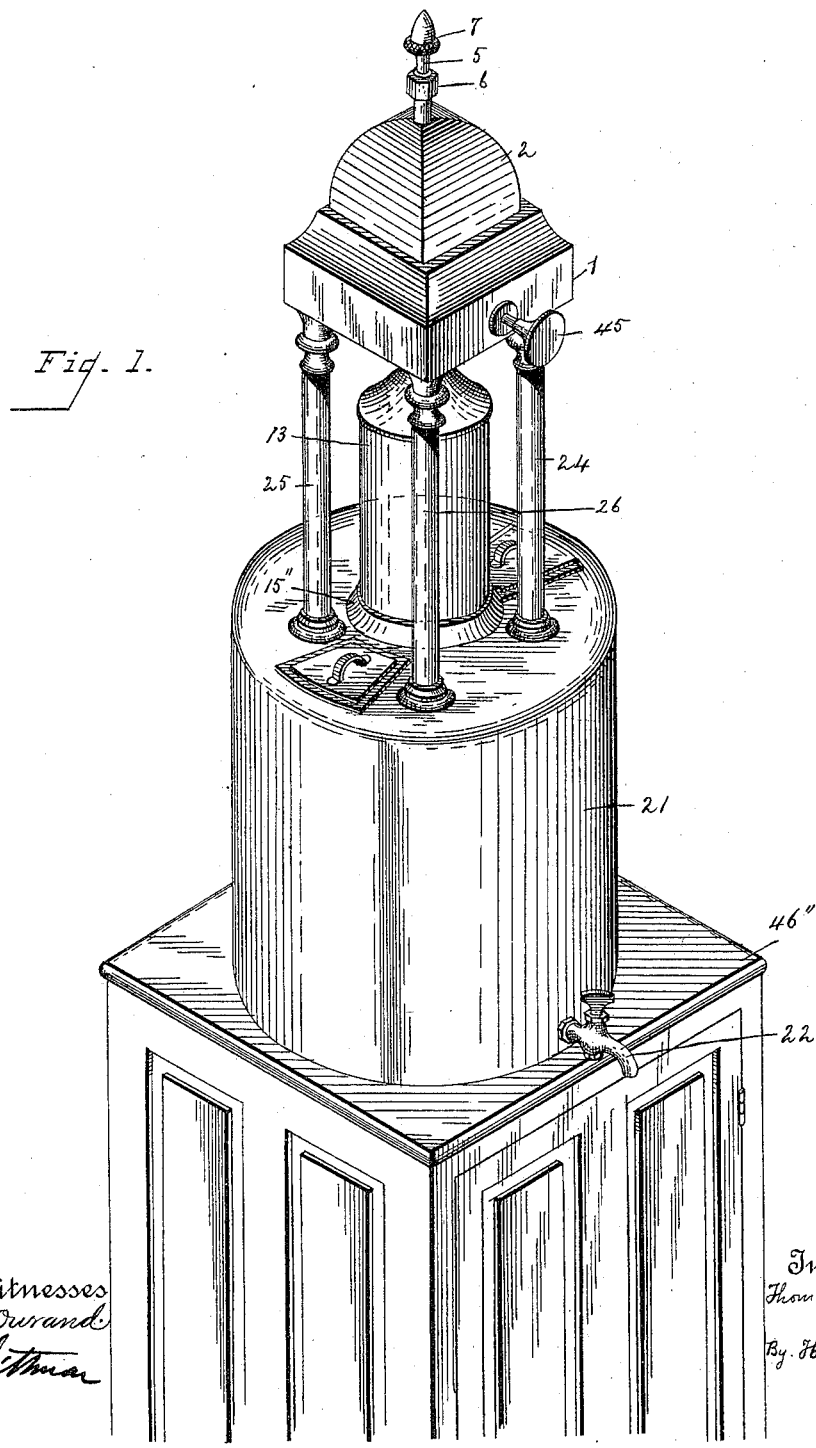
Figure 4:
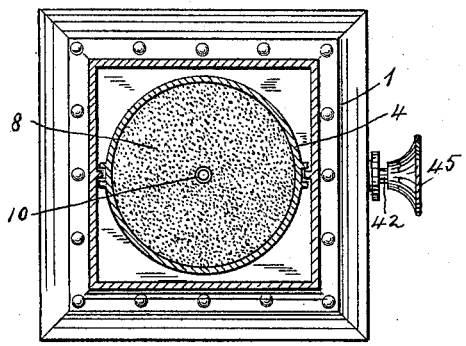
Figure 5:
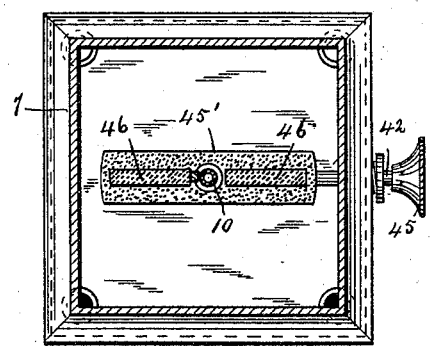
Figure 6:
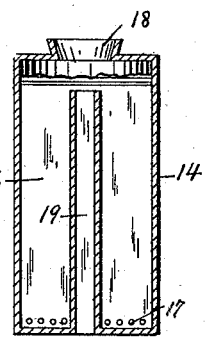
Figure 3:
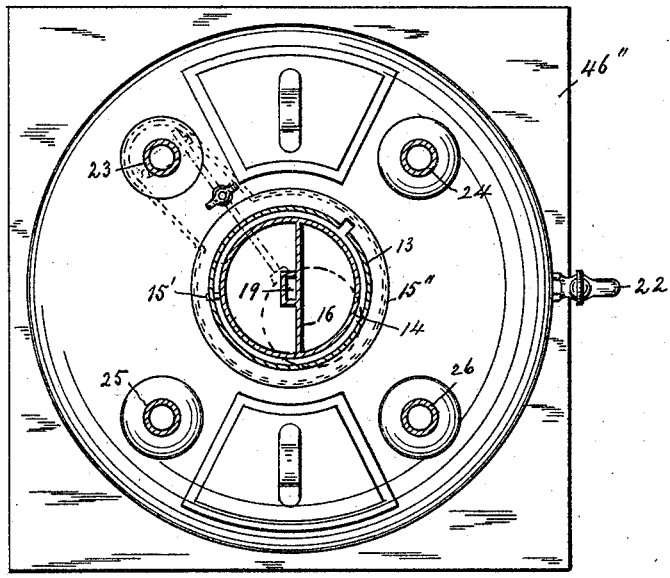

Figure 1 is a perspective view of my improved filtering apparatus in position for use. Fig. 2 is a vertical transverse section of same. Fig. 3 is a horizontal cross-section through the line $x\,x$ of Fig. 2. Fig. 4 is a horizontal cross-section through the line $x'\,x'$ of Fig. 2; Fig. 5, a horizontal section taken on the line $x''\,x''$, also of Fig. 2; and Fig. 6, a vertical transverse section of the purifying receptacle.

Referring to the drawings, the figure 1 indicates a filtering-chamber, which is constructed, preferably, of metal and of any desired shape. In the present instance it is represented in rectangular form with a contracted top and a dome-shaped cover 2, having an air-tight joint between same, as indicated at 3. Within the said chamber and its cover is located a bell-shaped chamber 4, the said chamber being suspended by means of a screw stem or rod 5, passing through a stuffing-box 6, which is securely packed, so as to be water-tight. The stem at its outer end is provided with a knob 7, by means of which it may be manipulated to raise or lower the chamber 4.

The mouth or lower part of the chamber 4 is provided with a porous filtering diaphragm 8, which may be of any suitable material. The said diaphragm is provided with a central aperture having a suitable packing 9, through which extends the upper end of a pipe 10, upon which the diaphragm is adapted to be moved vertically for the purpose hereinafter described.

The lower end of the pipe 10 is screwed or otherwise securely fitted in bottom of the chamber 1, so as to connect, by a downwardly-projecting pipe 11 and thimble-joint 12, with the top of a secondary filtering-chamber 13, which is provided with a removable receptacle 14, adapted to rest on an inwardly-projecting flange 15 of the aforesaid chamber, which is also detachable, being held by a side projecting pin 15' and slotted base-ring 15'', forming part of or secured to the top of the filtered-water receptacle. All the parts are made tight by suitable packing.

The removable receptacle 14 is divided by a vertical partition 16, having perforations 17 in the lower part thereof, forming communication between the two compartments. One of the said compartments is provided with a funnel-shaped mouth 18, through which the water from the upper filter is received, while the other compartment is provided with an overflow-pipe 19, by which the filtered water is conveyed through the bottom of the receptacle and allowed to drip into the filtered-water reservoir 20 below same.

The receiving-compartment of the aforesaid receptacle is filled with good-sized lumps of charcoal or other filtering material, while the second compartment has the lower part thereof packed with similar material, a strata of fine sand above same, and a layer of pebbles thereon.

The filtered-water reservoir 20 is preferably surrounded by an ice-compartment, as shown at 21, having double walls packed with non-conductor material and provided at its top with suitable openings and covers for the introduction of the ice. As no claim is made to this feature, it is not deemed necessary to herein further explain.

The filtered water is withdrawn from the reservoir through a service-pipe and faucet, (shown at 22.)

The filtering-chamber 1 is supported above the filtered-water reservoir by columns 23 24 25 26, two of which are open throughout their whole length, so as to serve, respectively, as inlet and outlet pipes. The ends of all the columns are outwardly screw-threaded, so that their upper ends may fit into screw-sockets formed in the bottom of the filtering-chamber 1, the lower ends of said columns being fitted in apertures in the top wall of the ice-compartment or filtered-water receptacle and securely held therein by threaded nuts or sleeves, as shown at 27 and 28 in Fig. 2, the joints at each end of the columns being made perfectly tight by washers or packing, as required in such cases.

The nuts or sleeves 27 28 are made sufficiently long to receive the upper threaded ends of the inlet and outlet pipes 29 30, the latter formed in two sections and having in its upper section a valve 31, to the stem of which is secured a lever 32, having a float 33, secured to the outer end thereof, so that the said valve shall be operated by the rising or falling of the water contained in the filtered-water receptacle. The lever 32 is pivotally connected with a rod 34, which is adapted to operate in an aperture in the top of the cooler or filtered-water receptacle. The upper part of this rod is screw-threaded and provided with a nut 35, by which the fall of the float is limited.

The inlet and outlet pipes 29 30 are each provided with stop-cocks, as at 36 37, so as to regulate the flow of water through same.

The numeral 38 indicates two or more arms secured to a hub 39, located in the filtering-chamber 1 and adapted to turn upon the pipe 10. The said hub is provided with a miter gear-wheel 40, which intermeshes with a similar miter gear-wheel 41, mounted on a rod 42, which passes through a stuffing-box 43, secured to the wall of the chamber 1. The said rod is supported near its inner end by a bearing 44 and is provided at its outer end with a milled button 45, by means of which it may be turned to operate the arms 38 before mentioned. These arms are provided with brushes 45' and rubber strips 46, upon which the porous diaphragm may be brought to bear, so that when the arms are turned and the chamber 4, with its porous diaphragm, depressed the brushes will scrub and clean the lower surface of the diaphragm. The rubber strips 46 serve to limit the pressure on the said brushes, and thus prevent injury to same.

A draining-faucet 46' is fitted in the bottom of the ice-compartment, or filtered-water receptacle should the ice-compartment be omitted, so that the same may be thoroughly drained when necessary.

The apparatus is mounted on a suitable table or stand 46'', which is preferably provided with closed sides, so as to hide from view the pipes contained therein.

The operation of my invention is as follows: The parts of the apparatus being properly assembled and mounted the water first enters the chamber 1 through the pipe 30 and column 23, then passes upward through the porous diaphragm, then downwardly through the pipe 10 into the secondary filter-receptacle 14, then through the filtering material contained therein and down through the overflow-pipe 19 into the filtered-water receptacle 20, where it is collected and stored for use.

When necessary to cleanse or repack the secondary filter, the same is removed by unscrewing the thimble-joint 12 and then slightly turning the said receptacle, so as to free it from the base-ring 15''.

To clean the surface of the filtering-diaphragm, open the outlet-valve 36 at the lower part of the pipe 29, permitting the water to pass through the lower part of the filtering-chamber 1, under full pressure, then rotate the brushes, by means of the milled button 45, upon the surface of the filtering-diaphragm, thereby removing therefrom the layer of foreign matter which has formed therein, which, on being released, will be taken up by the current and be carried away by the outlet-pipe 29.

Having thus described my invention, what I claim as new, and desire to secure by Letters Patent, is—

1. The combination in a filtering apparatus, of a filtering-chamber connected to a suitable service-pipe, a movable chamber located in said filtering-chamber and means for moving it vertically, the said chamber being provided with a porous diaphragm having a packed central aperture through which the outlet-water passes, the brush-arms and brushes, and means substantially as described, whereby the said brushes may be operated to scrub the diaphragm, as set forth.

2. The combination in a filtering apparatus of a filtering-chamber having a chamber located therein provided with a porous diaphragm and a packed central outlet-pipe, brushes, means for operating the brushes to clean the porous diaphragm, the secondary filtering-chamber provided with a removable receptacle, and means for connecting same with the primary filtering-chamber, and a receptacle for the filtered water, substantially as specified.

3. The combination with the filtering-chamber and filtered-water receptacle, of a feed-pipe having a regulating-valve and an operating-lever having a float attachment, as described, the operating-lever provided with a threaded stem adapted to operate in an opening in the cover of the filter-chamber, and nut whereby the fall of the float is limited, and the supply of water to be filtered, regulated, substantially as set forth.

4. In a filtering apparatus having a filtering-chamber and a supplemental chamber located therein provided with a porous diaphragm, revolving brushes for cleansing same, and a packed central outlet-pipe through the diaphragm, the combination of a secondary filter having a removable receptacle provided with a vertical partition having openings in the lower part thereof, the compartment at one side of the partition having a funnel-shaped mouth and the other compartment provided with an overflow-pipe having an outlet through the bottom of the secondary filter, and a receptacle for the filtered water, substantially as set forth.

In testimony whereof I affix my signature in the presence of two witnesses.

THOMAS D. McCLARY.

Witnesses:
GUSTAVE DITTMAR,
JAS. A. RICHMOND.